C. GIBBS.
STENCILING MACHINE.
APPLICATION FILED AUG. 24, 1908.

1,056,274.

Patented Mar. 18, 1913.

5 SHEETS—SHEET 3.

Witnesses:
W. Fritz
John C. Seifert

Inventor:
Charles Gibbs
By B. C. Stickney
Attorney.

C. GIBBS.
STENCILING MACHINE.
APPLICATION FILED AUG. 24, 1908.

1,056,274.

Patented Mar. 18, 1913.

5 SHEETS—SHEET 4.

Witnesses:
W. Fritz.
John C. Seifert.

Inventor:
Charles Gibbs
By B.C. Stickney
Attorney.

C. GIBBS.
STENCILING MACHINE.
APPLICATION FILED AUG. 24, 1908.
1,056,274.
Patented Mar. 18, 1913.
5 SHEETS—SHEET 5.
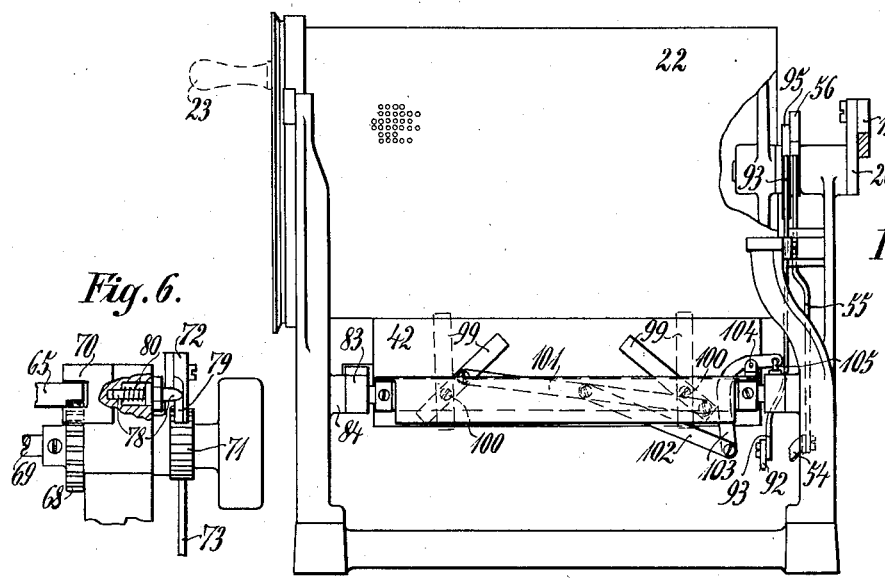

UNITED STATES PATENT OFFICE.

CHARLES GIBBS, OF NEW YORK, N. Y., ASSIGNOR TO UNDERWOOD TYPEWRITER COMPANY, OF NEW YORK, N. Y., A CORPORATION OF NEW JERSEY.

STENCILING-MACHINE.

1,056,274.   Specification of Letters Patent.   Patented Mar. 18, 1913.

Application filed August 24, 1908. Serial No. 449,893.

*To all whom it may concern:*

Be it known that I, CHARLES GIBBS, a citizen of the United States, residing in borough of Bronx, city of New York, in the county of New York and State of New York, have invented certain new and useful Improvements in Stenciling-Machines, of which the following is a specification.

This invention relates to means for feeding sheets from a pile to a stenciling or other machine.

The principal objects of the invention are to provide simple and reliable means for advancing sheets from the bottom of a pile to a stencil cylinder.

According to my present improvements, the sheets are laid partly upon one or more feeding rolls with the leading edge of the pile abutting against a gate of improved construction. The feeding rolls are revolved intermittently, and the leading roll is provided with means to carry the sheet past the gate, whereupon the rear edge of the sheet is engaged by pushers which carry it forward into the bite of the rolls of the stenciling machine.

Other features and advantages will hereinafter appear.

Figure 1:
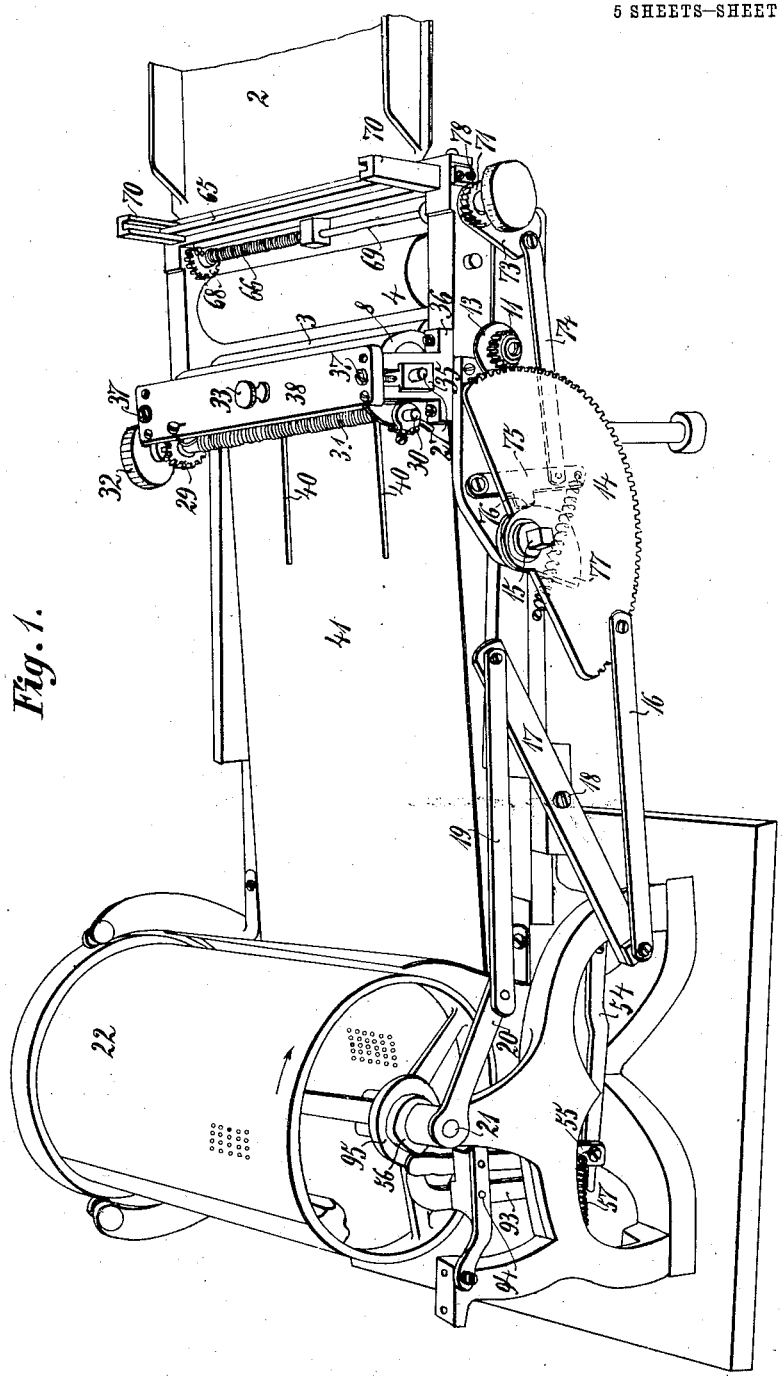
Figure 2:
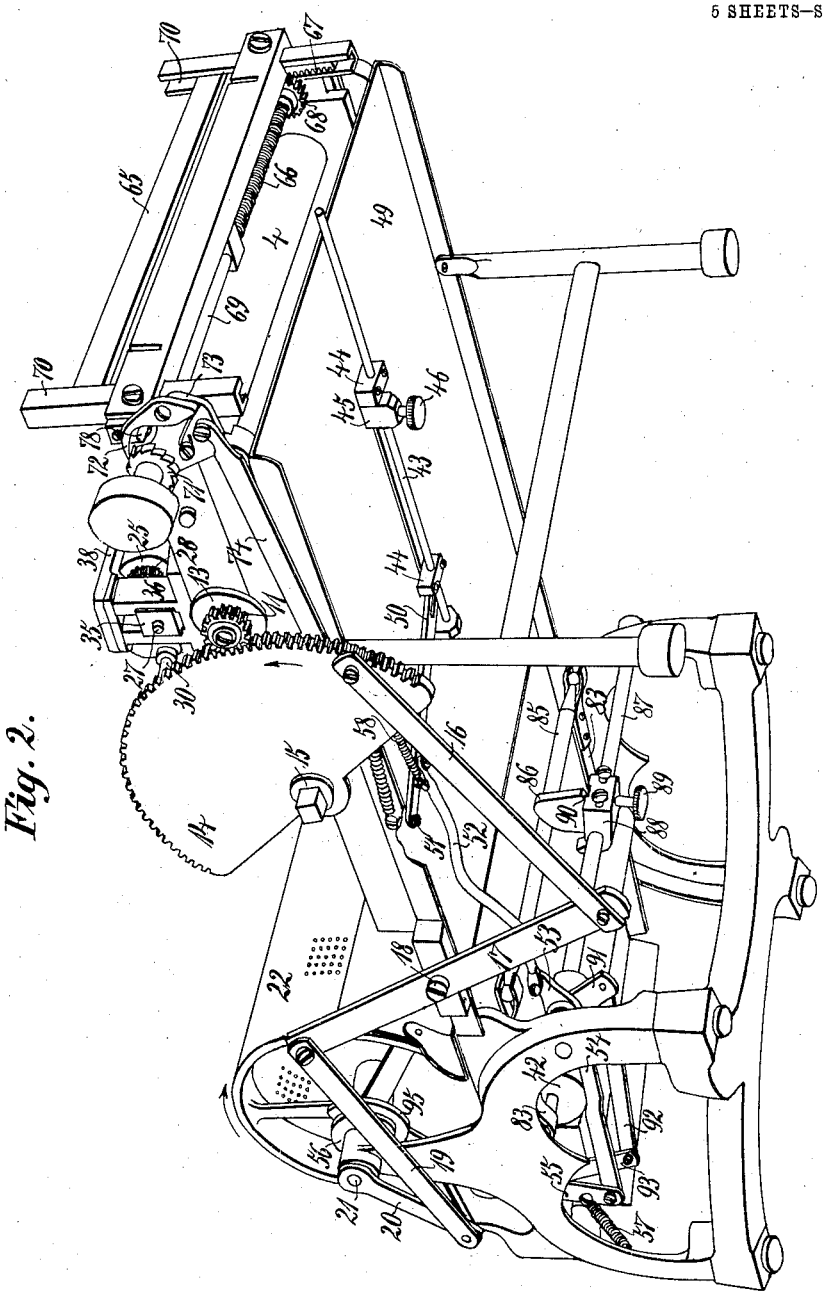
Figure 3:
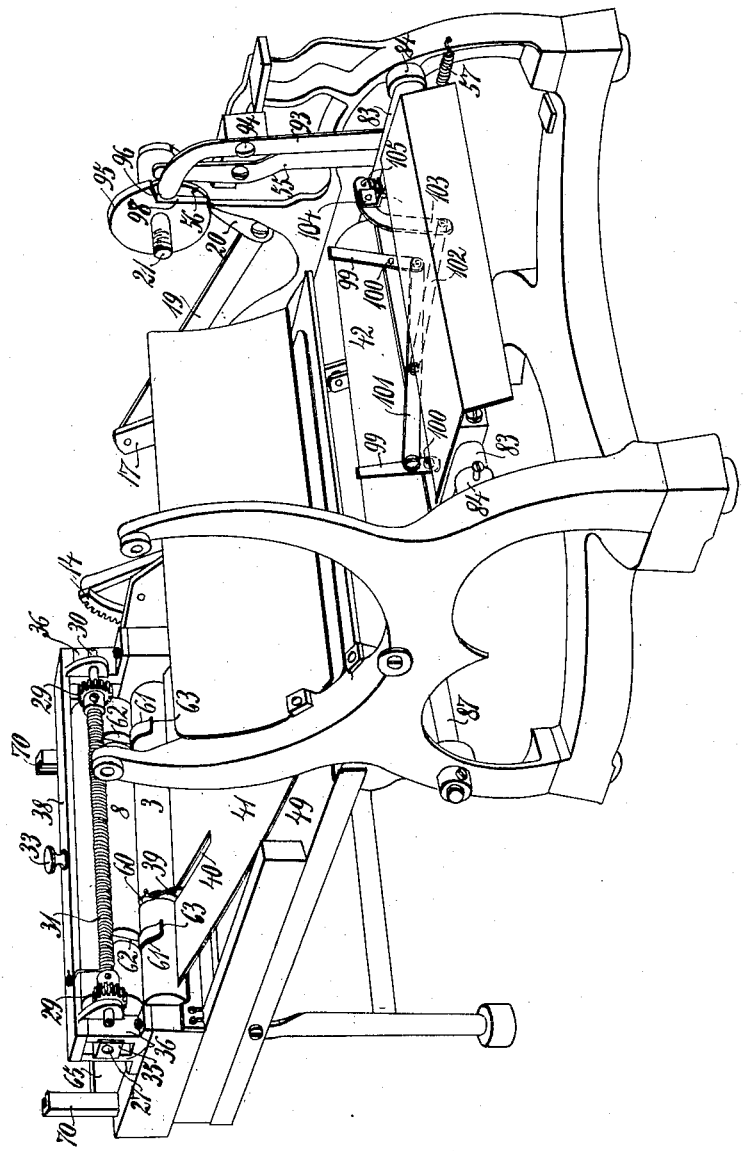
Figure 4:
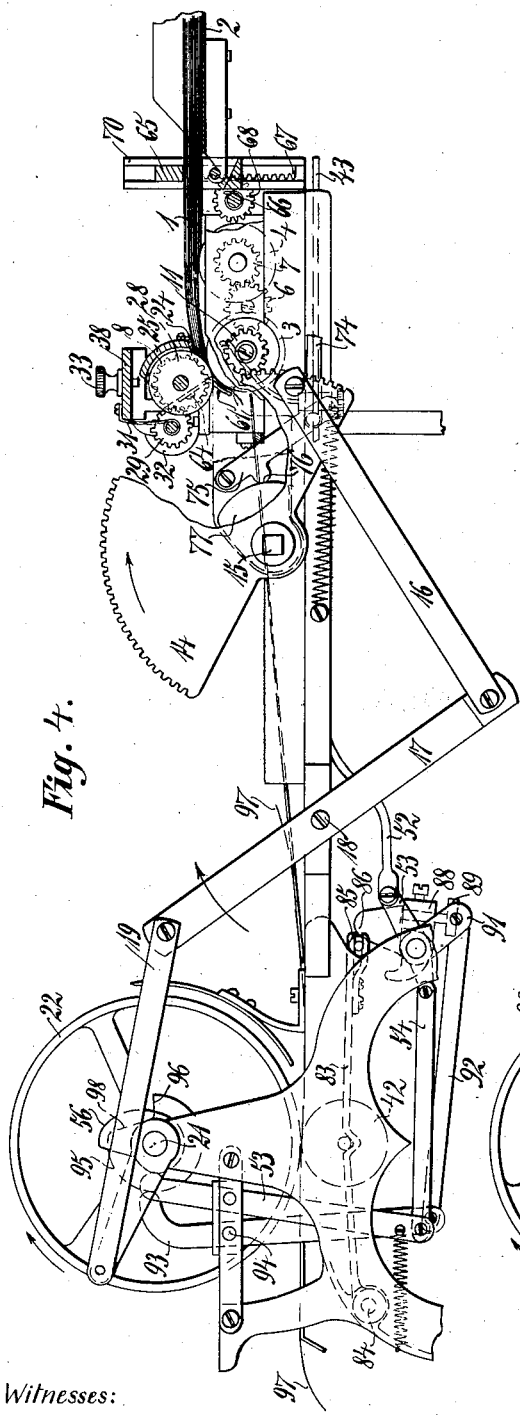
Figure 5:
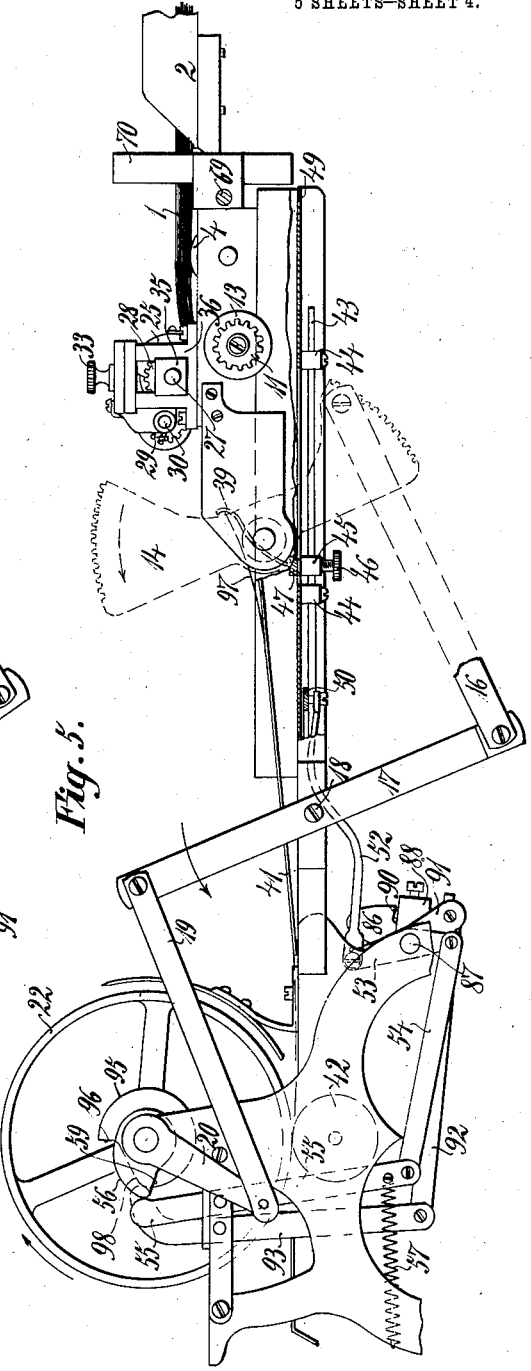

In the accompanying drawings, Figure 1 is a perspective top view of a self-feeding stencil machine. Fig. 2 is a perspective bottom view of the same. Fig. 3 is a front perspective view with the stencil cylinder omitted. Figs. 4 and 5 are side elevations partly in section. Fig. 6 is a detail of the pile clamp trip mechanism. Fig. 7 is a front elevation showing the operation of the sheet-gage of the stencil machine. Fig. 8 is a sectional front elevation showing the pawl and ratchet by which the sheet-advancing roll is operated. Fig. 9 is a sectional front elevation taken just in front of the sheet-advancing roll. Fig. 10 is a sectional side elevation illustrating the manner of separating and advancing the sheets.

The pile 1 of sheets is laid down with its rear portion resting upon a table 2, and its front portion upon soft rubber feed rolls 3, 4, which are connected by gears 5, 6, 7, to rotate in the same direction. Above the forward or main feed roll 3 and in proximity thereto is a stationary gate 8 in the form of a fixed soft rubber cylinder, which is a little in advance of the roll 3, and prevents the latter from advancing more than one sheet at a time from the bottom of the pile.

The separating and feeding roll 3 is connected by a pawl 9 and ratchet 10 (Fig. 8) with a pinion 11, said ratchet and pinion being mounted on the same shaft 12 as the roll 3, the pinion being loose upon the shaft, but fixed to a disk 13 upon which the pawl 9 is pivoted. In mesh with the pinion 11 is a large segment gear or curved rack 14 pivoted upon a stud at 15, and connected by a link 16 to a lever 17 fulcrumed at 18 upon the framework. Said lever is connected by a link 19 to a crank 20 fixed to a drive shaft 21 which forms the axle of a foraminous stencil cylinder 22, to which the sheets 1 are to be fed; said shaft 21 forming the main drive-shaft of the entire apparatus. This shaft may be turned by any suitable means, as a pulley; or the cylinder 22 may have a handle 23 fixed thereto, Fig. 7. It will be seen that at each revolution of the stencil cylinder 22, the rack 14 is reciprocated. During one stroke of the rack the separating roll 3 is advanced in the direction of the arrow, Fig. 10; while during the return stroke of the rack said roll 3 remains stationary, the pawl 9 running idly over the teeth of the ratchet 10. By reason of the movement-multiplying gearing 11, 14, the roll 3 is given several turns at each operation, sufficient to separate a sheet and advance it beyond the pile.

The leading edge portion of a pile of sheets is pressed down upon the top of the roll 3 by means of a plate 24, Fig. 4; said plate being shown elevated at Fig. 10, to permit the insertion of a pile of sheets into the machine. Said plate 24 is, for convenience, secured upon the lower edge of a curved plate or bar 25, having at its ends arms 26 by which it is loosely pivoted upon a shaft 27, the latter fixed in the machine and carrying the gate or stationary cylinder 8. Fixed to said arms 26 are gears 28 meshing with pinions 29, the latter fixed upon the ends of a rock-shaft 30 suitably journaled in the machine. A spring 31 coiled about the rock-shaft 30 serves to turn the shaft and thereby rock the gears 28 and press the plate 24 down upon the pile of sheets. The rock-shaft and the set of gears insures the even action of the plate 24 along its entire length upon the pile of sheets. Said plate 24 may be lifted by means of a finger-piece or button 32 fixed upon the projecting end of the rock-shaft 30; and a detent 33 may be provided to engage a perforation 34 in the bar 25 to hold the plate 24 elevated, as at Fig. 10.

The ends of the fixed shaft 27, carrying the gate 8, are supported in blocks 35 guided up and down in standards 36; and screws 37 bear down upon said blocks to hold the gate 8 in proper relation to the coöperating roll 3; the screws 37 being independently adjustable, and permitting either end of the gate to be either released or pressed toward the roll 3. Said detent 33 is carried upon a cross bar 38 capping the standards 36.

Each sheet which is separated by the roll 3 from the pile of sheets is carried away from said roll by a pair of pusher fingers 39, which play forwardly and backwardly in slots 40 formed in the rear portion of a shelf or apron 41, which leads from the roll 3 to the under side of the stencil cylinder 22, where the latter is engaged by a soft rubber roll 42 that presses the sheet up against the inked stencil usually carried upon the cylinder 22. Said pusher fingers 39 are fixed upon a slide rod or carriage 43, which is mounted in blocks 44 secured to a bottom plate 49 of the framework. It will be seen that a block 45 is secured by a set screw 46 to said rod 43, and that a bar 47 is secured midway between its ends by a screw 48 to the lug or collar 45, Figs. 2 and 9; and that the upstanding pusher fingers 39 are fixed at their lower ends in the ends of said bar 47. The pusher slide 43 is operated by a lever 50 pivoted at 51 on the bottom plate 49, and connected by a link 52 to a lever 53 also mounted upon the framework. From said lever 53 a link 54 extends forwardly to the lower end of a lever 55 whose upper end runs in contact with a cam 56 provided upon the drive shaft 21. Said cam 56 operates through the described connections to drive the pushers 39 forwardly; and springs 57 and 58 serve to cause the pushers to retreat to normal position. The cam 56 is shaped to cause a relatively slow advance movement of the pushers 39 to deliver the sheet to the bite of the rolls 22, 42; and it also has an abrupt face 59 to permit the springs 57, 58, to return the pushers at relatively high speed to enable them to get out of the way of the next sheet to be separated from the pile 1.

It will be observed that the main separating roll 3 is provided with deep peripheral grooves 60 into which the pusher fingers retreat. The rearmost position of said pusher fingers is seen at Fig. 4.

In order to enable the roll 3 to carry the rear edge of each sheet forwardly beyond the gate 8 or beyond the line of contact between said gate and the roll 3, I provide a pair of smooth yielding metal fingers 61 extending from recesses 62 in the gate 8 around the front side of the main feeding roll 3 and close thereto; said fingers preferably terminating in forwardly projecting lips 63. It will be seen at Fig. 3 that said fingers 61 overlap the pusher fingers 39, that is, that the guiding fingers 61 coöperate with roll 3 to feed the rear edge portion of the sheet forwardly toward the point at which said edge is engageable by said pusher fingers 39. The rear ends of the fingers 61 may be bent up and secured by screws 64 to the body of the gate 8, as at Fig. 9.

It will be understood that the main advancing roll 3 keeps turning forwardly until the rear edge of the sheet is delivered to said pushers; and in order to avoid premature advance of another sheet from the bottom of the pile during this final portion of the rotation of said roll 3, that is during the movement of the rear edge of the advancing sheet around the top to the front of the roll 3, I provide a clamping bar 65, which is caused by a spring 66 to clamp the pile of sheets after the bottom sheet has advanced beyond said clamp and until the roll 3 begins its next sheet-advancing operation. Said clamping bar 65 is fixed at its ends to a pair of racks 67 meshing with pinions 68, the latter fixed upon a transverse shaft 69, whereby the bar 65 is caused to move in parallelism. The racks 67 move in vertical guides 70 secured upon the framework. It will be understood that the clamp 65 may be arranged at any desired point from front to rear along the pile of sheets. When in operation, it has the effect of obviating any tendency of the lower sheets creeping ahead; and the farther back it is located the more effect it has in overcoming this creeping tendency, because the clamp may be dropped sooner after the lowest sheet starts forward. Upon said pinion shaft 69 is fixed a ratchet wheel 71; and a pawl 72 therefor is carried upon an arm 73 which is hung loosely upon said rock-shaft and connected by a link 74 to a lever 75 having a nose 76 to engage a cam 77 fixed upon the inner side of the segment gear 14; the cam 77 being timed to lift the clamping bar 65 at the proper moment, and to hold it up during the proper interval. The spring 66 causes the clamp to follow down the diminishing pile of sheets; and the pawl and ratchet enable the clamp to be released at the proper time, regardless of the height of said pile. A trip-pin 78, Figs. 2 and 6, is arranged in the path of the pawl 72, to trip the latter away from the ratchet wheel at the beginning of the return stroke of the pawl, the arm 73, the link 74, etc. During the up or advance stroke of the pawl, a bevel 79 formed thereon presses the trip pin 78 aside; the latter being immediately restored to normal position by a spring 80, so as to trip the pawl upon the return stroke of the latter. Other forms of pile clamp may be employed.

At the rear end of the paper table 2, there may be placed an adjustable gage 81 for the pile of sheets, secured by a thumb screw 82. The roll 4 is preferably higher than the roll 3, so that in bending down from the former to the latter the front end of the sheets in the pile tend to separate one from another, with the lowest sheet projecting the farthest forward.

The impression roll 42 is carried upon a pair of arms 83 hinged at their rear ends upon the framework at 84 and joined at their front ends by a release bar 85, whereby the roll 42 is controlled. Midway between its ends said bar is engaged by a cam 86 loosely mounted upon a transverse rock-shaft 87. Upon the latter is fixed an arm 88 into which is threaded a thumb screw 89, which bears up against the under edge 90 of said cam; so that by turning said screw fine variations may be effected in the pressure of the roll 42 against the stencil cylinder or the paper thereon. Also fixed upon the rock-shaft 87 is an arm 91 connected by a link 92 to an upright lever 93, the latter fulcrumed at 94 on the framework and bearing against a cam-collar 95 fixed upon the shaft 21. During the major part of each revolution of the cylinder 22, said lever 93 rides upon the portion of the collar 95 which is concentric with the shaft 21, whereby the roll 42 is held up against the cylinder 22; but once in each revolution the lever rides down the side 96 of a notch formed in the collar, thereby permitting the roll 42 to drop from the cylinder, this drop occurring to permit the leading edge of the advancing sheet 97 to pass between the roll and the cylinder. Then the lever 93 rides up an incline or cam 98 formed on the collar 95, and restores the roll 42 to normal position.

The leading edge of the released sheet may be gaged by a pair of upstanding gage arms 99 pivoted at 100 upon the framework to swing upwardly and downwardly away from and toward each other. Said gage arms are connected by a link 101, and this is connected by a second link 102 to a lever 103 pivoted at 104 upon the framework, and connected by a link 105 or other suitable device to one of the roll-carrying arms 83, so that when the latter drops to permit the sheet to pass, the gage arms 99 are thrust up to gage the leading edge of the sheet, so that when the arm 83 rises again to cause the roll 42 to bite the sheet, the gage arms 99 drop to clear the sheet.

In operation a pile of sheets 1 is laid upon the table 2 and supported at its forward portion by soft rubber rolls 3, 4. The rear end of the pile is set against the gage 81, and at its forward end abuts against the stationary soft rubber gate 8. The handle 23 is then employed to rotate the stencil cylinder 22 and its shaft 21. The crank 20 acts through the link 19, lever 17 and link 16, to oscillate the segmental gear 14; the latter turning the pinion 11 back and forth, and the pawl 9 and ratchet 10 serving to drive the feed-rolls 3 and 4 forward during half of the revolution of the stencil cylinder 22. Said rolls 3 and 4 carry forward the bottom sheet from the pile, the gate 8 preventing more than one sheet from advancing at a time. The fingers 61 guide the sheet forwardly and down around the leading roll 3; and the sheet runs forwardly along the table 41; the fingers 61 serving to coöperate with the roll 3, to advance the sheet after it has passed the gate 8. During the first part of the advance of the bottom sheet, the clamp 65 stands released from the pile, as at Fig. 10. As soon as the sheet has been carried forwardly from the gate 8 by the rotating roll 3, the pusher fingers 39 advance to push the sheets between the stencil cylinder and the pressure roll 42; whereupon the fingers retreat to normal position. The pressure roll 42 is dropped to permit the sheet to pass between it and the stencil cylinder 22; and the leading edge of the sheet is carried by the pusher fingers 39 against the gage arms 99 which at this moment stand vertically in the dotted line position at Fig. 7. Then the pressure roll 42 rises to press the sheet against the stencil cylinder, and the gage arms 99 drop to permit the sheet to advance. During the return stroke of the segment gear 14, the clamp 65 is lifted by means of the cam 77, lever 75, link 74, arm 73, pawl 72, ratchet 71, pinions 68, and racks 67. The clamp remains in this position during part of the sheet-advancing or forward stroke of the segment gear 14; but after the bottom sheet has advanced beyond said clamp, the pawl 72 is tripped by the pin 78 and releases the ratchet 71, whereupon the spring 66 forces the clamp down upon the pile, to prevent premature movement of the succeeding bottom sheet.

Variations may be resorted to within the scope of the invention, and portions of the improvements may be used without others.

I claim—

1. The combination with a sheet-advancing roll and a gate in proximity thereto, of a sheet-guiding finger extending from the gate forwardly around the roll to coöperate with the roll to advance the sheet, and a pusher in advance of the roll to engage the rear edge of the sheet to advance it still farther, said finger serving to guide the rear edge of the sheet down to position to be engaged by said pusher.

2. The combination with an intermittently operating sheet-advancing roll, and a gate in proximity thereto, of a series of sheet-guiding fingers extending from the gate around the roll, to press against the latter to advance the sheet from the gate, and pusher fingers to engage the rear edge of the sheet and advance the same, said guiding fingers overlapping said pusher fingers.

3. The combination with a roll and means coöperating therewith to separate the sheets and advance them from the pile, of a pusher finger to engage the rear edge of the separated sheet and carry it away from the pile, said roll having a peripheral groove to afford a passage for said pusher finger.

4. The combination with a roll and means coöperating therewith to separate the sheets and advance them from the pile, of a series of pusher fingers to engage the rear edge of the separated sheet and carry it away from the pile, said roll having a series of peripheral grooves to afford passages for said pusher fingers.

5. The combination with rolls to which the sheets are to be fed, and a driving shaft connected to one of said rolls, of means for separating the sheets and advancing them from a pile, a sheet-pusher movable between said advancing means and said rolls, a cam on said driving shaft, and connections between said cam and said sheet-pusher.

6. The combination with rolls to which the sheets are to be fed, and a driving shaft connected to one of said rolls, of means for separating the sheets and advancing them from a pile, a sheet-pusher movable between said advancing means and said rolls, a cam on said driving shaft, connections between said cam and said sheet-pusher, and a spring to return said sheet-pusher after it is operated by said cam.

7. The combination with rolls to which the sheets are to be fed, and a driving shaft connected to one of said rolls, of means for separating the sheets and advancing them from a pile, a sheet-pusher movable between said advancing means and said rolls, and means to give the pusher a relatively slow advancing movement and a relatively quick retreating movement.

8. The combination with rolls to which the sheets are to be fed, and a driving shaft connected to one of said rolls, of means for separating the sheets and advancing them from a pile, a sheet-pusher movable between said advancing means and said rolls, a cam on said driving shaft, connections between said cam and said sheet-pusher, a spring to return said pusher, said cam and spring operating to give said pusher a relatively slow advancing movement and a relatively quick retreating movement.

9. The combination with rolls to which the sheets are to be fed, and a driving shaft connected to one of said rolls, of means for separating the sheets and advancing them from a pile, a sheet-pusher movable between said advancing means and said rolls, a cam on said driving shaft, connections between said cam and said sheet-pusher, a lever engaging said cam, a slide on which said pusher is mounted, and connecting means between said lever and said slide.

10. The combination with rolls to which the sheets are to be fed, and a driving shaft connected to one of said rolls, of means for separating the sheets and advancing them from a pile, a sheet-pusher movable between said advancing means and said rolls, a cam on said driving shaft, connections between said cam and said sheet-pusher, comprising a lever engaging said cam, a slide on which said pusher is mounted, connecting means between said lever and said slide, and a spring to return the slide and pusher after advancing the sheet.

11. The combination with a sheet-advancing roll and a gate in proximity thereto, of a movable pressure plate extending along said roll close to said gate, a spring to cause said plate to press the sheets against the roll, and a finger-piece to lift said pressure plate away from the roll, to permit the insertion of a pile of sheets.

12. The combination with a sheet-advancing roll and a gate in proximity thereto, of a movable pressure plate extending along said roll close to said gate, a spring to cause said plate to press the sheets against the roll, a finger-piece to lift said pressure plate away from the roll, to permit the insertion of a pile of sheets, and a detent to hold said pressure plate released.

13. The combination with a sheet-advancing roll and a gate in proximity thereto, of a movable pressure plate extending along said roll close to said gate, and a spring to cause said plate to press the sheets against the roll, said gate in the form of a fixed soft rubber or other roll having a shaft, and said pressure plate hinged upon said shaft.

14. The combination with a sheet-advancing roll and a gate in proximity thereto, of a movable pressure plate extending along said roll close to said gate, a spring to cause said plate to press the sheets against the roll, a pair of gears connected to the ends of said pressure plate, and a rock-shaft having pinions fixed thereon in mesh with said gears.

15. The combination with a sheet-advancing roll and a gate, of a plate extending along said roll, said gate mounted upon a shaft and said pressure plate hinged upon said shaft, a pair of gears upon said shaft and fixed to the ends of said pressure plate, and a rock-shaft having pinions fixed thereon and meshing with said gears.

16. The combination with a sheet-advancing roll and a gate, of a plate extending along said roll, said gate mounted upon a shaft and said pressure plate hinged upon said shaft, a pair of gears upon said shaft and fixed to the ends of said pressure plate, a rock-shaft having pinions fixed thereon and meshing with said gears, and a finger-piece upon said rock-shaft.

17. The combination with a sheet-advancing roll and a gate in proximity thereto, of a movable pressure plate extending along said roll close to said gate, a spring to cause said plate to press the sheets against the roll, said gate in the form of a fixed soft rubber or other roll having a shaft, and said pressure plate hinged upon said shaft, boxes in which said fixed shaft is mounted, and screws to adjust the gate toward and from the sheet-advancing roll.

18. The combination with a sheet-advancing roll and a gate in proximity thereto, of a movable pressure plate extending along said roll close to said gate, a spring to cause said plate to press the sheets against the roll, said gate in the form of a fixed soft rubber or other roll having a shaft, and said pressure plate hinged upon said shaft, boxes in which said fixed shaft is mounted, and screws to adjust the gate toward and from the sheet-advancing roll, said screws independently operable to adjust either end of the gate independently of the other end.

19. The combination with a stencil cylinder having a drive shaft, of a releasable roll to press the sheets against the cylinder, means connected to said drive shaft to release and restore said roll, and a sheet-gage on the delivery side of said roll and comprising a pair of gage-arms movable upwardly and downwardly away from and toward each other.

20. The combination with a stencil cylinder having a drive shaft, of a releasable roll to press the sheets against the cylinder, means connected to said drive shaft to release and restore said roll, a sheet-gage on the delivery side of said roll and comprising a pair of gage-arms movable upwardly and downwardly away from and toward each other, a link connecting said gage arms, and means to turn the arms up when the roll is released, and to turn them down when the roll is restored.

21. The combination with a stencil cylinder having a drive shaft, of a releasable roll to press the sheets against the cylinder, means connected to said drive shaft to release and restore said roll, a sheet-gage on the delivery side of said roll and comprising a pair of gage-arms movable upwardly and downwardly away from and toward each other, a link connecting said gage arms, connections to turn the arms up when the roll is released, and to turn them down when the roll is restored, said connections including a second link extending from said link, a lever pivoted upon a fixed part, and a connection between said lever and one of a pair of roll-carrying arms, and a cam for causing the roll-carrying arms to rise and fall.

CHARLES GIBBS.

Witnesses:
B. C. STICKNEY,
JOHN O. SEIFERT.